(12) United States Patent
Burns

(10) Patent No.: US 7,934,749 B2
(45) Date of Patent: May 3, 2011

(54) FLEXIBLE GAS GENERATOR

(75) Inventor: Sean P. Burns, Almont, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 818 days.

(21) Appl. No.: 11/336,174

(22) Filed: Jan. 20, 2006

(65) Prior Publication Data

US 2006/0157961 A1    Jul. 20, 2006

Related U.S. Application Data

(60) Provisional application No. 60/645,574, filed on Jan. 20, 2005.

(51) Int. Cl.
*B60R 21/26* (2011.01)

(52) U.S. Cl. .................................. 280/741; 280/736

(58) Field of Classification Search ............. 280/741, 280/736, 740, 742; 102/530, 531; 149/2
See application file for complete search history.

(56) References Cited

U.S. PATENT DOCUMENTS

| | | | |
|---|---|---|---|
| 3,397,639 A | 8/1968 | Alderfer | |
| 3,606,377 A | 9/1971 | Martin | |
| 3,721,456 A | 3/1973 | McDonald | |
| 3,733,088 A | 5/1973 | Stephenson | |
| 3,799,573 A | 3/1974 | McDonald | |
| 3,897,961 A | 8/1975 | Leising et al. | |
| 3,904,221 A | 9/1975 | Shiki et al. | |
| 3,929,074 A | 12/1975 | San Miguel | |
| 3,986,808 A | 10/1976 | Keith | |
| 4,005,876 A | 2/1977 | Jorgensen et al. | |
| 4,012,211 A | 3/1977 | Goetz | |
| 4,109,578 A * | 8/1978 | Goetz | 102/531 |
| 4,200,615 A | 4/1980 | Hamilton et al. | |
| 4,322,385 A | 3/1982 | Goetz et al. | |
| 4,358,998 A | 11/1982 | Schneiter et al. | |
| 4,846,368 A | 7/1989 | Goetz | |
| 4,878,690 A | 11/1989 | Cunningham | |

(Continued)

FOREIGN PATENT DOCUMENTS

JP        5-64015        8/1993

*Primary Examiner* — Paul N Dickson
*Assistant Examiner* — Drew Brown
(74) *Attorney, Agent, or Firm* — L.C. Begin & Associates, PLLC

(57) ABSTRACT

In accordance with the present invention, a flexible gas generator (10) is provided which includes a first flexible housing (14) defining an interior, the first housing (14) having an exterior surface. A first flexible, porous covering (15) is positioned in contact with substantially the entire exterior surface of the first housing (14). The first housing (14) and covering (15) are positioned within a second flexible housing (12). The first (14) and second (12) housings may be formed from polymeric or metallic tubing. A second flexible, porous covering (19) may be positioned to cover substantially the entire exterior surface of the second housing (12). The flexible first covering (15) may comprise multiple layers of, for example, a braided or a mesh material. The flexible coverings (15, 19) provide structural support for the housings (12, 14) while cooling and filtering the generated gases. A series of plenums (390) may be formed between adjacent layers of the first covering and/or a series of baffles (100) may be positioned between the layers to direct the flow of inflation gases and to cool the gases. Use of flexible tubing and flexible coverings provides the gas generator with substantial flexibility.

22 Claims, 4 Drawing Sheets

U.S. PATENT DOCUMENTS

| | | |
|---|---|---|
| 4,890,860 A | 1/1990 | Schneiter |
| 4,950,458 A | 8/1990 | Cunningham |
| 5,028,070 A * | 7/1991 | Bender .................. 280/741 |
| 5,094,475 A | 3/1992 | Olsson et al. |
| 5,109,772 A | 5/1992 | Cunningham et al. |
| 5,139,588 A | 8/1992 | Poole |
| 5,308,370 A | 5/1994 | Kraft et al. |
| 5,322,322 A | 6/1994 | Bark et al. |
| 5,409,259 A | 4/1995 | Cunningham et al. |
| 5,439,250 A | 8/1995 | Kokeguchi et al. |
| 5,443,286 A | 8/1995 | Cunningham et al. |
| 5,462,308 A | 10/1995 | Seki et al. |
| 5,464,249 A | 11/1995 | Lauritzen et al. |
| 5,503,079 A | 4/1996 | Kishi et al. |
| 5,540,154 A | 7/1996 | Wilcox et al. |
| 5,540,459 A | 7/1996 | Daniel |
| 5,542,704 A | 8/1996 | Hamilton et al. |
| 5,547,638 A | 8/1996 | Rink et al. |
| 5,562,303 A | 10/1996 | Schleicher et al. |
| 5,573,271 A | 11/1996 | Headley |
| 5,588,672 A | 12/1996 | Karlow et al. |
| 5,623,115 A | 4/1997 | Lauritzen et al. |
| 5,626,360 A | 5/1997 | Lauritzen et al. |
| 5,635,665 A | 6/1997 | Kishi et al. |
| 5,743,556 A | 4/1998 | Lindsay et al. |
| 5,743,559 A * | 4/1998 | Nakajima et al. ............. 280/741 |
| 5,827,996 A | 10/1998 | Yoshida et al. |
| 5,845,933 A | 12/1998 | Walker et al. |
| 5,868,424 A | 2/1999 | Hamilton et al. |
| 5,871,228 A | 2/1999 | Lindsay et al. |
| 5,967,550 A | 10/1999 | Shirk et al. |
| 6,019,861 A | 2/2000 | Canterberry et al. |
| 6,029,994 A | 2/2000 | Perotto et al. |
| 6,032,979 A | 3/2000 | Mossi et al. |
| 6,039,820 A | 3/2000 | Hinshaw et al. |
| 6,051,158 A | 4/2000 | Taylor et al. |
| 6,056,319 A | 5/2000 | Ruckdeschel et al. |
| 6,062,143 A | 5/2000 | Grace et al. |
| 6,077,371 A | 6/2000 | Lundstrom et al. |
| 6,142,518 A | 11/2000 | Butt et al. |
| 6,145,876 A | 11/2000 | Hamilton |
| 6,170,867 B1 | 1/2001 | Rink et al. |
| 6,176,517 B1 | 1/2001 | Hamilton et al. |
| 6,177,028 B1 | 1/2001 | Kanda et al. |
| 6,315,847 B1 | 11/2001 | Lee et al. |
| 6,347,566 B1 | 2/2002 | Rabotinsky et al. |
| 6,416,599 B1 | 7/2002 | Yoshikawa et al. |
| 6,497,429 B2 | 12/2002 | Matsumoto |
| 6,595,547 B2 | 7/2003 | Smith |
| 6,601,871 B2 | 8/2003 | Fischer |
| 6,688,231 B1 | 2/2004 | Herrmann |
| 6,752,421 B2 | 6/2004 | Khandhadia et al. |
| 6,755,438 B2 | 6/2004 | Rink et al. |
| 6,805,377 B2 | 10/2004 | Krupp et al. |
| 6,846,013 B2 | 1/2005 | Smith |
| 6,854,764 B2 | 2/2005 | Larsen et al. |
| 6,979,022 B2 * | 12/2005 | Smith et al. .................. 280/741 |
| 2001/0045735 A1 * | 11/2001 | Krupp et al. ................. 280/741 |
| 2003/0155757 A1 * | 8/2003 | Larsen et al. ................ 280/741 |
| 2004/0084885 A1 | 5/2004 | Burns et al. |
| 2005/0104349 A1 | 5/2005 | Stevens et al. |
| 2005/0116454 A1 | 6/2005 | Stevens |
| 2005/0151358 A1 | 7/2005 | Burns |
| 2005/0200103 A1 | 9/2005 | Burns et al. |
| 2005/0218637 A1 | 10/2005 | Burns |
| 2005/0218638 A1 | 10/2005 | Burns et al. |

\* cited by examiner

US 7,934,749 B2

FLEXIBLE GAS GENERATOR

CROSS REFERENCE TO RELATED APPLICATIONS

This application claims the benefit of provisional application Ser. No. 60/645,574, filed on Jan. 20, 2005.

BACKGROUND OF THE INVENTION

The present invention relates to gas generators for vehicle airbags and, more particularly, to a flexible linear gas generator which discharges inflation gas along the length of the gas generator for use in side impact or head curtain airbag systems.

Typical side impact or head curtain airbag modules use one or more standard airbag gas generators discharging into a distribution pipe for delivering the gas to the bag. Typical linear gas generators are also formed with a relatively rigid longitudinal housing specially shaped to be positioned and secured to a specific portion of a vehicle. The variety of housing shapes required for use in a multitude of possible vehicles increases the costs of manufacturing the gas generators. In addition, the variety of possible housing lengths and shapes increases the costs and difficulty of handling and shipping the gas generators.

SUMMARY OF THE INVENTION

In accordance with the present invention, a flexible gas generator is provided which includes a first flexible housing defining an interior, the first housing having an exterior surface. A first flexible, porous covering is positioned in contact with substantially the entire exterior surface of the first housing. The first housing and covering are positioned within a second flexible housing. The first and second housings may be formed from polymeric or metallic tubing. A second flexible, porous covering may be positioned to cover substantially the entire exterior surface of the second housing. The flexible first covering may comprise multiple layers of, for example, a braided or a mesh material. The flexible coverings provide structural support for the housings while cooling and filtering the generated gases. A series of plenums may be formed between adjacent layers of the first covering and/or a series of baffles may be positioned between the layers to direct the flow of inflation gases and to cool the gases. Use of flexible tubing and flexible coverings provides the gas generator with substantial flexibility.

DETAILED DESCRIPTION

Figure 1:
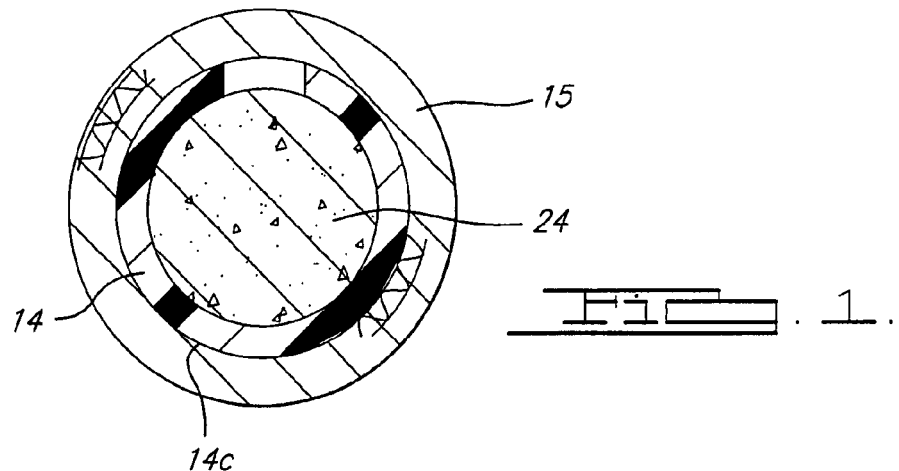
FIG. 1 is a cross-sectional side view showing the basic components of the gas generator of the present invention.
Figure 2:
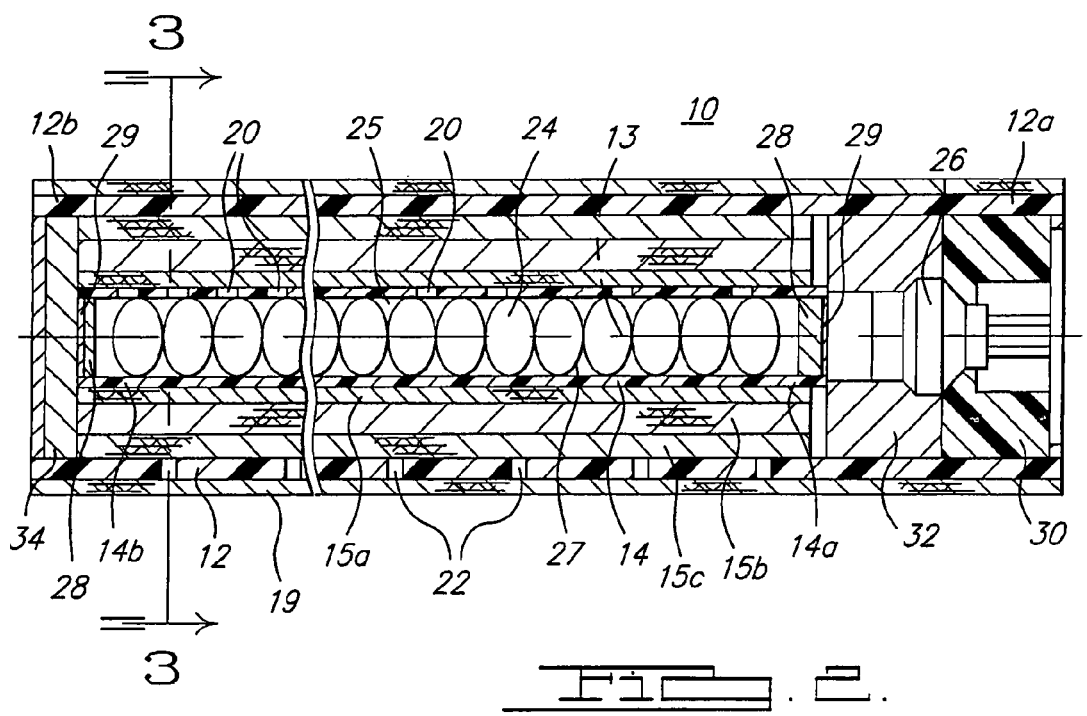
FIG. 2 is a cross-sectional side view showing a first embodiment of a gas generator in accordance with the present invention.
Figure 3:
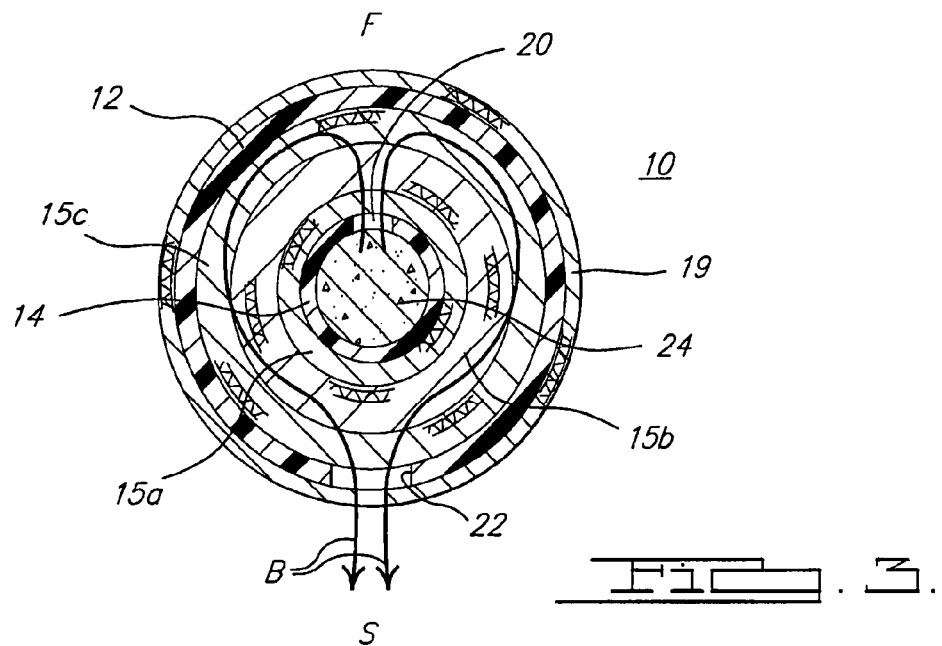
FIG. 3 is a cross-sectional end view of the gas generator of FIG. 2.

FIGS. 1-3 show cross-sectional views of a gas generator 10 in accordance with one embodiment of the present invention. Gas generator 10 includes a first flexible housing 14 defining an interior and having an exterior surface 14c. A first flexible, porous covering, generally designated 15, is positioned in contact with substantially the entire exterior surface of first housing 14. As used herein, the term "porous" refers to the ability of the material to admit the passage of gas or liquid through pores or interstices.

In a particular embodiment, the length of the gas generator is in the range of approximately three feet to approximately eight feet long, and the gas generator has a substantially uniform outer diameter within the range of approximately 0.5 to approximately 1.0 inch along its length. All the component parts of gas generator 10 are manufactured from materials and with processes known in the art.

Referring again to FIGS. 1-3, first housing 14 includes a first end 14a, a second end 14b opposite first end 14a, and a longitudinal axis. First housing 14 also has one or more orifices 20 formed therealong. Orifice(s) 20 are adapted to convey gas produced by the combustion of a gas generant composition 24 (described later) from the interior of first housing 14 to an exterior of the first housing. In one embodiment, orifice(s) 20 are aligned along the length of first housing 14. Orifice(s) 20 also open from the first housing interior toward a first side (designated "F") of the gas generator. Orifice(s) 20 may be formed as one or more longitudinal slits extending along first housing 14, or the orifice(s) may be formed as holes spaced along first housing 14. In an alternative embodiment (not shown), first housing 14 has weakened portions or perforations formed along the length of the tube, which are designed to rupture under the pressure of combustion gases generated in the first housing. A pressure-rupturable barrier such as a burst disk or film (not shown) may be positioned to seal one or more of orifice(s) 20, thereby substantially preventing fluid communication between the interior of first housing 14 and the exterior of the housing prior to activation of the gas generator.

First housing 14 may be formed from a known flexible polymeric tubing, for example, rubber, low density polyethylene, high density polyethylene, Viton™, or polytetrafluoroethylene. Alternatively, flexible metallic tubing may be employed. In accordance with preferred design criteria, the structure of first housing 14 must withstand gas pressures sufficient to allow combustion propagation of gas generant 24 along the first housing at rates of about 1-2 feet per millisecond.

Referring again to FIGS. 1-3, flexible covering 15 extends in one or more annular layers about first housing 14, coaxial with the first housing. covering 15 is designed to withstand the burst pressure of first housing 14 encased therein, and generally to provide structural reinforcement for first housing 14. In the embodiment shown in FIGS. 1-3, covering 15 comprises at least one layer of braided metallic tubing or sleeving substantially enclosing first housing 14. Covering 15 is also positioned along a gas flow path exiting first housing orifice(s) 22, for filtering particulate materials produced during gas generant combustion, and to serve as a heat sink for cooling hot inflation gases. In a particular embodiment, covering 15 comprises multiple layers of braided material wrapped around first housing 14 to increase the degree of cooling and filtration experienced by the combustion gases. The embodiment shown in FIGS. 1-3 incorporates three braided layers 15a, 15b, and 15c surrounding first housing 14.

Examples of suitable braided materials are textiles such as nylon, fiberglass, and metals such as steel and copper. Features such as material, fiber or wire size, and braiding density are chosen to accommodate the desired burst pressure of inner housing 14 and the desired gas flow rate through the braid based on porosity of the braided layer(s). Suitable braided materials are readily obtainable from any of a variety of suppliers, for example Glenair, Inc. of Glendale, Calif., and Bay Associates of Menlo Park, Calif. In an alternative embodiment, first covering 15 is formed from one or more layers of a wire mesh or cloth or a woven metallic mesh readily obtainable from any of a variety of suppliers, for example Wayne Wire of Bloomfield Hills, Mich. 48304.

In the embodiment shown in FIGS. 1-3, first housing 14 and first covering 15 are positioned within an interior of a second housing 12. Second housing 12 includes a first end 12a, a second end 12b, and a longitudinal axis 13. Second housing 12 has one or more orifice(s) 22 formed therealong to enable fluid communication between the interior and an exterior of the second housing. Orifice(s) 22 are adapted to convey gas produced by the combustion of a gas generant composition 24 (described below) to an associated airbag (not shown). In the embodiment shown in FIGS. 1-3, orifice(s) 22 are aligned along the length of second housing 12. Orifice(s) 22 also open from the second housing interior toward a second side (designated "S") of the gas generator. Orifice(s) 22 may be formed as one or more longitudinal slits extending along second housing 12, or the orifice(s) may be formed as holes spaced along second housing 12. Second housing 12 may be formed from a known flexible polymeric tubing, for example, rubber, low density polyethylene, high density polyethylene, Viton™, or polytetrafluoroethylene. Alternatively, flexible metallic tubing may be employed.

A second covering 19, similar to first covering 15, may be applied over second housing 12 to cover substantially the entire outer surface of the second housing.

In the embodiment shown in FIGS. 1-3, first housing 14 is positioned substantially coaxial with second housing 12. In addition, as seen in FIGS. 1-3, second side S of gas generator 10 is opposite first side F of the gas generator. The arrangement of the respective second and first housing orifices toward opposite sides of the gas generator maximizes filter efficacy by forcing the inflation gas produced during gas generator activation to flow out of first housing orifices 20, around first housing 14 and through first covering 15, and out of gas generator 10 through second housing orifices 22. In flowing from first housing orifices 20 to second housing orifices 22, the inflation gas stream becomes bifurcated, a portion of the stream flowing around one side of first housing 14, and another portion of the stream flowing around an opposite side of the first housing, as indicated by arrows "B" of FIG. 3. Positioning first housing orifice(s) 20 and second housing orifice(s) 22 as described provides substantially equal filtration of each portion of the gas stream, by placing second housing orifice(s) 22 a substantially equal distance from first housing orifice(s) 20 along either side of first housing 14.

Gas generant tablets 24 are stacked side by side along the length of first housing 14. In the embodiment shown in FIGS. 1-3, each tablet 24 has substantially the same dimensions. In a particular embodiment, each gas generant tablet 24 has an outer diameter of approximately ¼" and a pair of opposing, generally dome-shaped faces 27, providing a maximum tablet width of approximately 0.165" between faces. As seen in FIG. 2, tablets 24 are shaped or configured to advantageously create a cavity 25 between adjacent tablets 24. These cavities 25 provide a volume of air space within first housing 14, thereby enhancing the burn characteristics of the tablets when they are ignited. An alternative arrangement of the gas generant along the length of the first housing may be provided as desired. However, any arrangement of gas generant along the first housing preferably provides a substantially uniform average distribution of gas generant along the length of the first housing. Examples of gas generant compositions suitable for use in the present invention are disclosed in U.S. Pat. Nos. 5,035,757, 6,210,505, and 5,872,329, incorporated herein by reference. However, the range of suitable gas generants and the shapes or extrusions of gas generants are not limited to those described in the cited patents. Accordingly, extruded lengths or strands of propellant could also be employed in accordance with the present invention.

Other items used in the assembly of the gas generator shown in FIGS. 1-3 are manufactured and/or supplied as described above, or are known in the art. The combination of the perforated polymeric inner housing with structural braiding is significantly more flexible than a conventional solid metal tube with perforations. Furthermore, the small diameter wires or fibers in the braiding have, in the aggregate, a significantly higher heat sink surface area than a conventional metal mesh filter for cooling of the generated gases.

A quantity of a known auto-ignition composition 28 may be positioned at either end of the stack of gas generant material 24. Inner housing 14 may also be environmentally sealed at both ends with an aluminum tape 29 or any other effective seal.

An igniter 26 is secured to gas generator 10 such that the igniter is in communication with an interior of inner housing 14, for initiating combustion of gas generant 24 upon occurrence of a crash event. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to first end 12a of second housing 12. A first endcap 32 is coaxially juxtaposed adjacent igniter closure 30 to form, in conjunction with igniter closure 30, a housing for igniter 26. First endcap 32 also provides an end closure for first housing 14. A second endcap 34 may be crimped or otherwise fixed to second end 12b of housing 12. Endcaps 32 and 34 and igniter closure 30 may be cast, stamped, extruded, or otherwise metal-formed. Alternatively, endcaps 32 and 34 and end closure 30 may be molded from a suitable polymer. Closures of the type used in industry for flexible high pressure hoses (e.g. hydraulic hoses) may be employed to close or adapt either end of the gas generator.

The embodiment shown in FIGS. 1-3 may be manufactured by forming perforations or weakened portions in a suitable tube to produce first housing 14. The gas generant is then inserted into the interior of housing 14, and covering 15 is applied over the first housing. Housing 14 and covering 15 are then inserted into second housing 12, and second covering 19 is applied over second housing 12. Auto-ignition composition 28, endcaps 32 and 34, igniter 26, and igniter closure 30 are then attached to second housing 12, and ends of the gas generator are then sealed by crimping or clamping, as desired.

Operation of the gas generator will now be discussed with reference to FIGS. 1-3.

Upon a crash event, a signal from a crash sensor (not shown) is conveyed to igniter 26, thereby activating the igniter and igniting gas generant 24. Upon activation of igniter 26, ignition of the gas generant 24 progresses rapidly from first housing first end 14a toward first housing second end 14b. A pressure wave produced by igniter 26 progresses down the length of first housing 14, igniting gas generant 24 as it passes. The gas generant ignites rapidly, feeding the pressure wave. Inflation gas produced by combustion of gas generant 24 proceeds out of first housing orifice(s) 20 and flows around either side of first housing 14 and also through first covering 15. The pressurized inflation gases are forced between the wires of fibers forming the braided material. The inflation gas then exits the gas generator via second housing orifice(s) 22. Arrows "B" in FIG. 3 illustrate an approximate direction of gas flow upon gas generator activation. In addition, in embodiments where first housing 14 is formed from a polymer material, heat generated by combustion of the gas generant produces melting and/or combustion of the material forming first housing 14. Where the material of first housing 14 burns, it provides an extra source of fuel for the combustion reaction, resulting in the generation of additional inflation gases.

EXAMPLE 1

An example of a gas generator formed in accordance with FIGS. 1-3 includes a PTFE (Teflon™) inner housing having an inner diameter of about 0.25 inches and a wall thickness of about 0.040 inches cut to a length of about 48 inches. 43 holes of diameter approximately 3.5 mm were drilled in one row, one inch apart on center, and three inches from either end of the hose. 304 stainless steel wires of approximately 0.011 inches in diameter were braided on the outside of the PTFE hose with 10.3 crossovers per inch. Crimp-type fittings were placed on both ends of the braided hose. Adapters were used to close one end of the assembly and fit the other for an igniter. Approximately 35 grams of domed gas generant having an outer diameter of approximately $3/16$ inches and having a thickness of about 0.145 inches was placed inside the first housing. The igniter was activated and the gas generant was ignited within four milliseconds along the entire length of the gas generator. The gas generator assembly remained intact and the gas generant was completely consumed.

Figure 4:
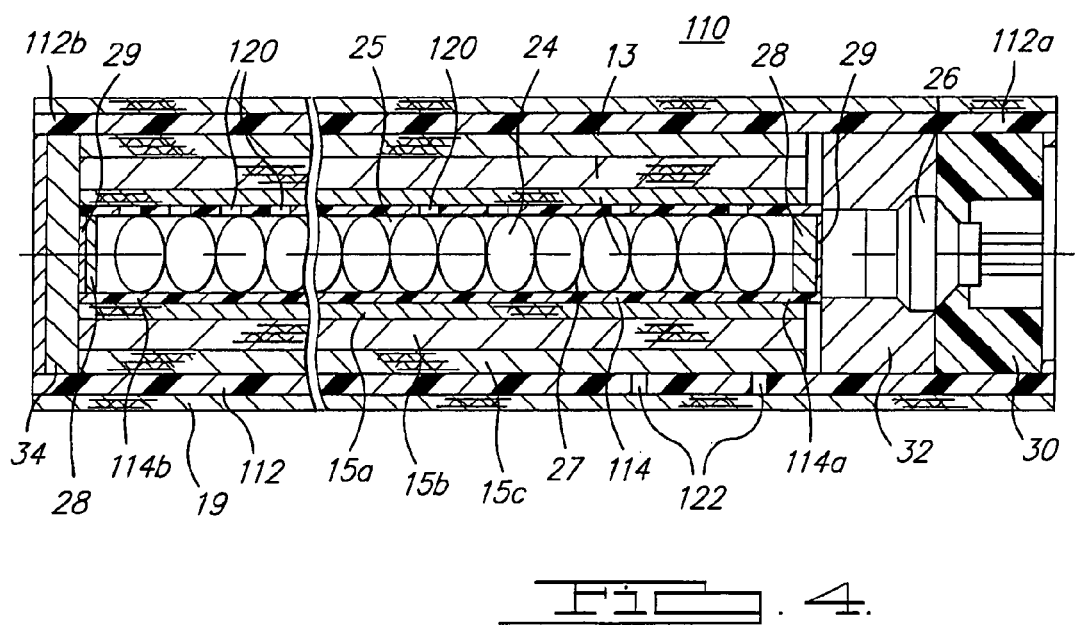
FIG. 4 is a cross-sectional side view of a first alternative embodiment of the gas generator of the present invention.

In another alternative embodiment, flow of inflation gases may also be directed axially through (i.e., substantially parallel with the longitudinal axis of the gas generator), as well as radially outward from, the gas generator. This enables portions of certain airbag configurations to be filled more rapidly than would be the case with purely radial inflation gas flow. FIG. 4 shows an embodiment 110 of a gas generator in accordance with the present invention that incorporates an axial flow component. Second housing 112 includes group of gas exit orifices 122 formed proximate a first end 112a of second housing 112. First covering 15 comprising multiple layers of braided material is positioned intermediate first housing orifices 120 and second housing first end orifices 122 for filtering and cooling combustion products generated by combustion of gas generant composition 24 within first housing 114. Upon activation of the gas generator, inflation gases flow from first housing apertures 120 through covering 15 to exit second housing first end orifices 122, into an associated airbag. The portion of the airbag to be inflated first is positioned proximate second housing first end 112a so as to receive the inflation gases exiting the gas generator. The gases then spread from the first airbag portion to the remainder of the airbag.

In a particular embodiment (not shown), the first housing gas exit orifices are formed proximate an end of the gas generator that is opposite or spaced apart from an end of the gas generator at which the second housing gas exit orifices are formed. In this embodiment, substantially all of the gases exit the first housing proximate a first end of the gas generator and travel axially along the gas generator and through the first covering to exit the second housing proximate a second end of the gas generator. This enables more thorough cooling of the gases prior to release and also enables a degree of control over the time elapsed between gas generator activation and inflation of the airbag.

Figure 5:
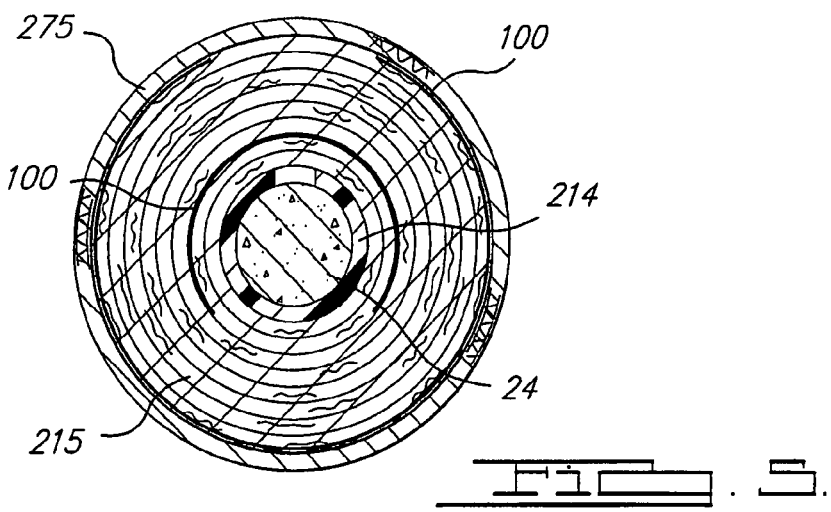
FIG. 5 is a cross-sectional side view showing a second embodiment of a gas generator in accordance with the present invention.

In yet another alternative embodiment, shown in FIG. 5, first flexible covering 215 comprises a plurality of layers of a mesh material, and one or more non-porous baffle element(s) 100 are positioned between adjacent layers of the plurality of layers of mesh material. Baffle elements 100 provide additional baffling for the inflation gases. The openings in baffle elements 100 are arranged to re-direct the flow direction of inflation gases as the gases pass through the baffles. Covering 215 may be a continuous sheet of material wrapped around first housing 214, with baffle elements 100 inserted between layers of covering material at suitable locations during the wrapping process. An additional flexible, porous covering 275 is provided enclosing first covering 215, for structural support and to provide additional cooling and filtering capability. In a similar embodiment (not shown), a second flexible porous covering substantially encloses the first covering, the second covering comprising a plurality of layers of a mesh material. One or more non-porous baffle element(s) are positioned between adjacent layers of the plurality of layers of mesh material, as described above. Baffle elements 100 may be formed from, for example, a steel shim material.

Figure 6:
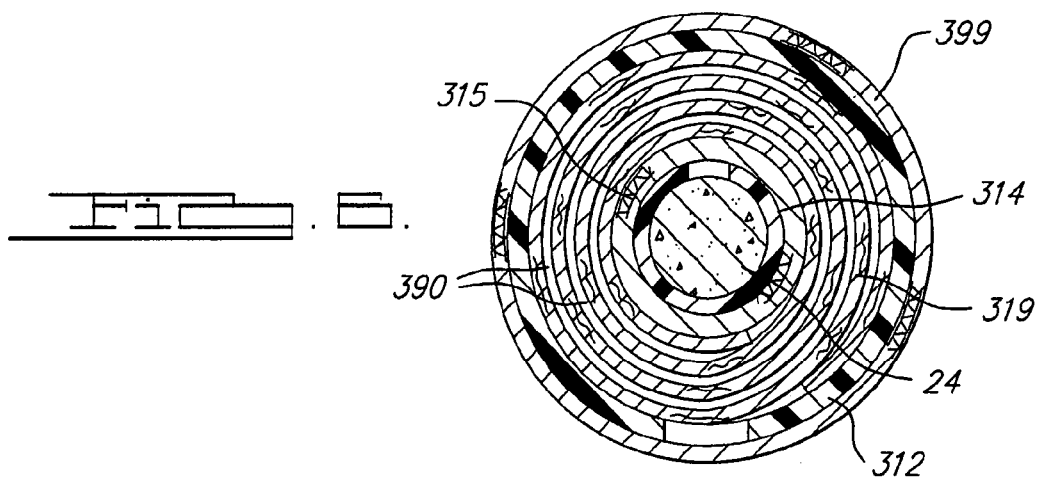
FIG. 6 is a cross-sectional side view showing a third embodiment of a gas generator in accordance with the present invention.

In yet another alternative embodiment, shown in FIG. 6, a second flexible housing 312 is provided, and first housing 314 and first flexible covering 315 are positioned within the second housing interior. A second flexible porous covering 319 comprising a plurality of layers of a mesh material substantially encloses first flexible covering 315. Second covering 319 is tightly wound around first housing 314 prior to insertion of first covering 315, first housing 314, and second covering 319 into second housing 312. However, when these components are inserted into the interior of second housing 312, the tightly wound second covering loosens and expands with the second housing interior, forming a series of plenums 390 between adjacent layers of second covering 319. This is a relatively simple and inexpensive method of forming a series of substantially coaxial plenums for receiving the inflation gas flow therethrough. If desired, an additional flexible porous covering 399 may be positioned over an exterior surface of second housing 312, as shown.

Figure 7:
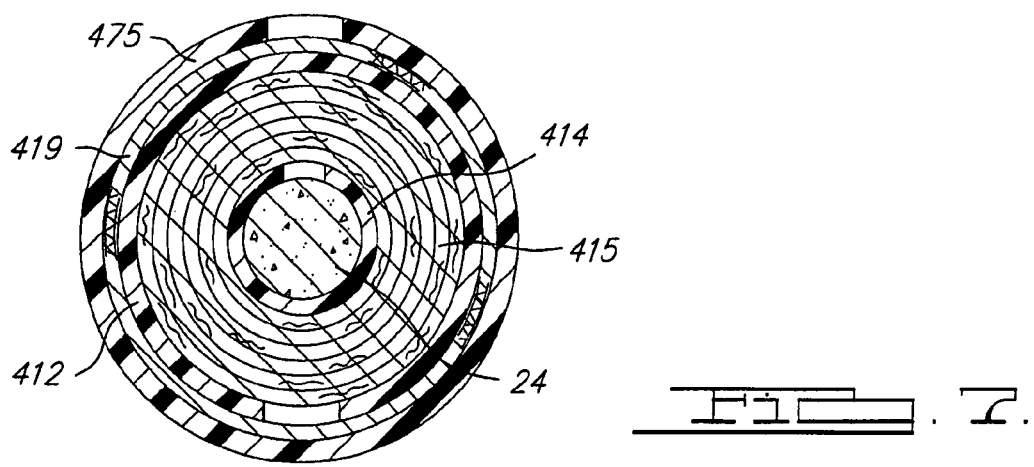
FIG. 7 is a cross-sectional side view showing a fourth embodiment of a gas generator in accordance with the present invention.

In yet another alternative embodiment, shown in FIG. 7, a second flexible housing 412 is provided, with first housing 414 and first flexible covering 415 are positioned within the second housing interior. A second flexible porous covering 419 is positioned in contact with substantially the entire exterior surface of the second housing. In addition, a third flexible housing 475 is provided, with second housing 412 and second flexible covering 419 positioned within the third housing interior. Provision of a third housing 475 enclosing the other components generally increases the strength of the gas generator assembly.

Figure 8:
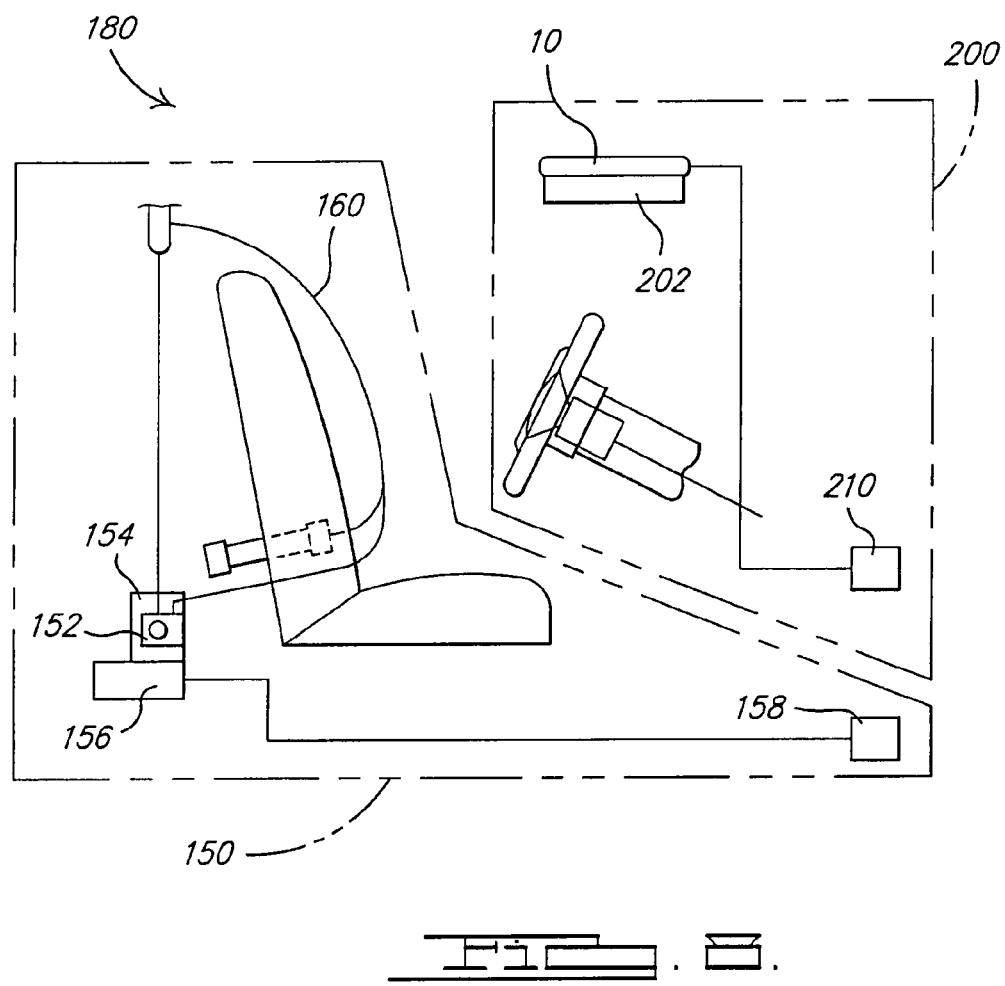
FIG. 8 is a schematic representation of an exemplary vehicle occupant restraint system incorporating a gas generator in accordance with the present invention.

Referring now to FIG. 8, any of the gas generator embodiments described above may also be incorporated into an airbag system 200. Airbag system 200 includes at least one airbag 202 and a gas generator 10 as described herein coupled to airbag 202 so as to enable fluid communication with an interior of the airbag. Airbag system 200 may also be in communication with a crash event sensor 210 operating in association with a known crash sensor algorithm that signals actuation of airbag system 200 via, for example, activation of airbag gas generator 10 in the event of a collision.

Referring again to FIG. 8, airbag system 200 may also be incorporated into a broader, more comprehensive vehicle occupant restraint system 180 including additional elements such as a safety belt assembly 150. FIG. 8 shows a schematic diagram of one exemplary embodiment of such a restraint system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The flexible design of the gas generator described herein facilitates coiling of the gas generator for ease of shipping and handling, and also facilitates uncoiling of the gas generator for ease of installation within a vehicle, for example. The flexible design also enables the gas generator to easily conform to curved channels and contours along surfaces of the vehicle as required for installation into the vehicle, without the need for a specially formed or shaped gas generator housing. In addition, the degree of cooling and filtration experienced by the combustion gases may be controlled by controlling the number of layers of flexible covering applied to the exterior of first housing 14, the number and configuration baffling elements interposed between the layers of covering, and the number of plenums formed between the layers.

It is contemplated that the gas generator of the present invention will find application primarily in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A gas generator comprising:
    a first flexible housing defining an interior;
    a gas generant material positioned in the interior so as to enable contact between the first housing and the gas generant material prior to activation of the gas generator; and
    a first flexible, porous covering in contact with a substantial portion of an exterior surface of the first housing prior to activation of the gas generator;
    a second flexible housing defining an interior, the second housing having an exterior surface, and;
    a second flexible porous covering in contact with a substantial portion of the exterior surface of the second housing,
    wherein the first housing and the first flexible covering are positioned within the second housing interior, and wherein the gas generator further comprises at least one orifice formed along the second housing whereby generated gases are conveyed from the second housing into an associated airbag.

2. The gas generator of claim 1 wherein the first housing has a wall and weakened portions formed in a structure of the wall along a length thereof, the weakened portions being configured to rupture under the pressure of combustion gases generated in the first housing.

3. The gas generator of claim 1 wherein the first flexible covering comprises at least one layer of a mesh material.

4. The gas generator of claim 3 wherein the first flexible covering comprises a plurality of layers of a mesh material, and further comprising at least one non-porous baffle element positioned between two adjacent layers of the plurality of layers of mesh material.

5. The gas generator of claim 1 wherein the first flexible covering comprises at least one layer of braided material.

6. The gas generator of claim 1 wherein the second flexible housing is formed from a polymer material.

7. The gas generator of claim 1 wherein the first housing has at least one orifice formed therealong to enable fluid communication between the first housing interior and an exterior of the first housing, the at least one first housing orifice opening from the housing interior toward a first side of the gas generator, and wherein the at least one second housing orifice opens from the second housing interior toward a second side of the gas generator.

8. The gas generator of claim 7 wherein the first flexible covering is positioned along a gas flow path between the at least one first housing orifice and the at least one second housing orifice, and wherein gases generated by combustion of the gas generant composition positioned within the first housing interior flow through the at least one first housing orifice and through the first flexible covering to exit the second housing through the at least one second housing orifice.

9. The gas generator of claim 7, wherein a direction of flow of inflation gas exiting the at least one second housing orifice is angularly spaced apart approximately 180 degrees from a direction of flow of inflation gas exiting the at least one first housing orifice.

10. The gas generator of claim 1 further comprising a third flexible housing defining an interior, and wherein the second housing and the second flexible covering are positioned within the third housing interior.

11. The gas generator of claim 1 wherein the second flexible housing is formed from a polymer material.

12. The gas generator of claim 1 wherein the second side of the gas generator is opposite the first side of the gas generator.

13. An airbag system comprising the gas generator of claim 1 and at least one airbag coupled to the gas generator so as to provide fluid communication between the gas generator and an interior of the airbag upon activation of the gas generator.

14. The airbag system of claim 13 wherein the at least one airbag is a side curtain airbag.

15. The airbag system of claim 13 wherein the at least one airbag is a head curtain airbag.

16. A vehicle occupant restraint system including the gas generator of claim 1.

17. The vehicle occupant restraint system of claim 16 further comprising a safety belt assembly including a housing and a safety belt extending from the housing.

18. The vehicle occupant restraint system of claim 16 further comprising a crash event sensor operating in association with a crash sensor algorithm that signals activation of the vehicle occupant restraint system in the event of a collision.

19. The gas generator of claim 1 wherein the first flexible covering comprises a plurality of layers of braided material, and wherein a braiding density of a first layer of the plurality of layers is different from a braiding density of a second layer of the plurality of layers.

20. The gas generator of claim 1 wherein the second housing includes a plurality of orifices formed therealong, and wherein at least a portion of the orifices are aligned along a length of the second housing.

21. The gas generator of claim 1 wherein the first covering is configured to withstand a burst pressure of the first housing.

22. The gas generator of claim 1 wherein the first covering is configured to provide structural reinforcement to the first housing.

* * * * *